United States Patent [19]

Tewfik

[11] Patent Number: 4,549,164
[45] Date of Patent: * Oct. 22, 1985

[54] LIQUID VOLUME INDICATOR

[76] Inventor: Farouk F. Tewfik, 6000 Goldenrod Dr., Reno, Nev. 89511

[*] Notice: The portion of the term of this patent subsequent to Nov. 22, 2000 has been disclaimed.

[21] Appl. No.: 358,442

[22] Filed: Mar. 15, 1982

Related U.S. Application Data

[63] Continuation-in-part of Ser. No. 29,978, Apr. 16, 1979, Pat. No. 4,417,232.

[51] Int. Cl.$^4$ .................. B60Q 1/00; G01F 23/00
[52] U.S. Cl. ............................ 340/59; 73/298; 73/303
[58] Field of Search ............... 340/59, 60, 618; 73/303, 298

[56] References Cited

U.S. PATENT DOCUMENTS

| | | | |
|---|---|---|---|
| 2,588,761 | 4/1951 | Raby | 340/59 |
| 2,717,991 | 9/1955 | Sherman | 340/59 |
| 2,728,070 | 12/1955 | Kelly | 73/298 |
| 4,417,232 | 11/1983 | Tewfik | 340/59 |

Primary Examiner—John W. Caldwell, Sr.
Assistant Examiner—Ellwood G. Harding
Attorney, Agent, or Firm—Philip Furgang

[57] ABSTRACT

A sensing device for determining the amount of liquid in an oil crankcase of a vehicle. A hollow dipstick, closed at one end and having a metering hole therein, is inserted into the crankcase of a car. The other end of the dipstick is connected by flexible tubing to a suction diaphragm and sensing diaphragm in a sensing module. The suction bellows and sensing diaphragm are linked together and to the dipstick by branches of a T-tubing. An opposed end of the suction diaphragm is connected to a piston of a solenoid. The sensing diaphragm is mounted to move in response to the amount of oil suctioned into the dipstick. An electrical circuit is formed between a push button, a solenoid, ground, and the car battery, such that, when the push button is closed, the solenoid becomes excited, drawing in the piston to thereby move the suction diaphragm. Movement of the suction diaphragm draws oil into the dipstick. An electrical current is coupled to the sensing diaphragm to indicate if oil is drawn up or samples in the dipstick.

15 Claims, 4 Drawing Figures

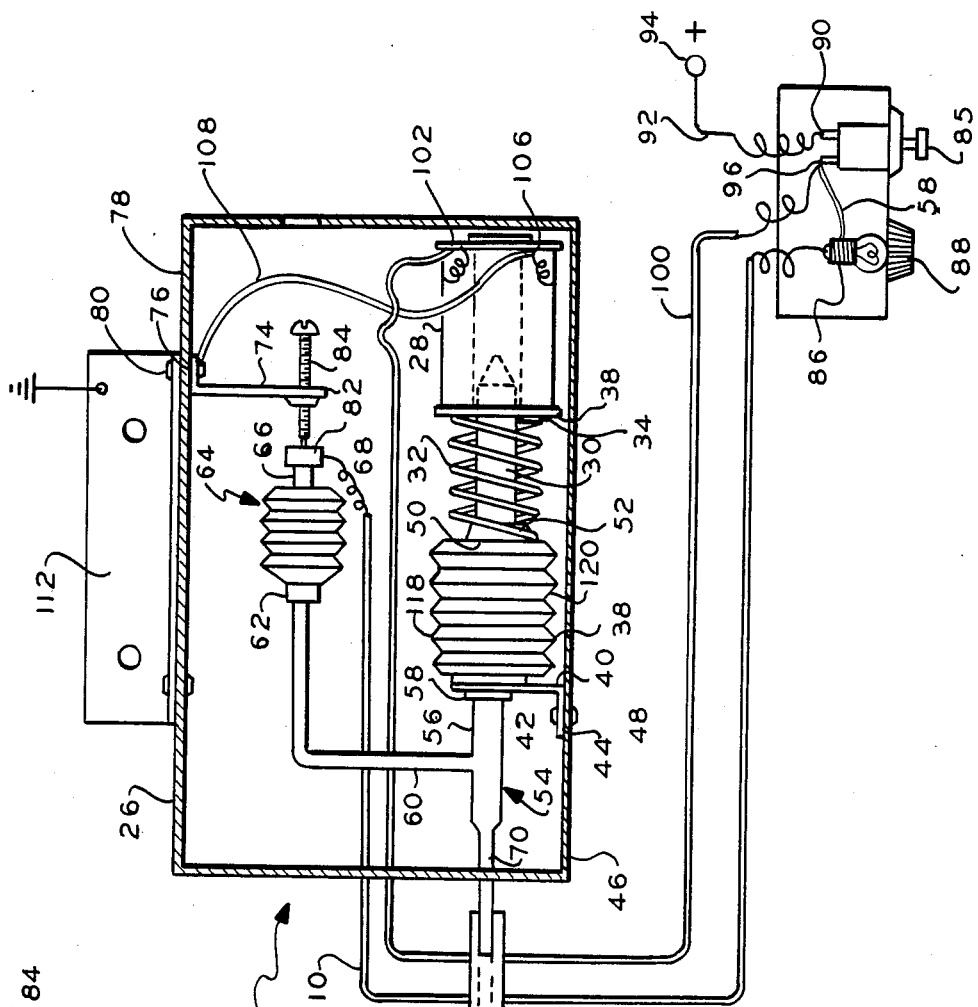

LIQUID VOLUME INDICATOR

RELATED APPLICATION

This application is a continuation-in-part of application Ser. No. 29,978, filed Apr. 16, 1979 now U.S. Pat. No. 4,417,232.

BACKGROUND OF THE INVENTION

This invention relates, in general, to devices for indicating the amount of liquid in a container, or the like, and, more particularly, to such devices which provide such information by use of a remote indicator.

There are many devices for indicating the level of liquid in a container. The most common is the common dipstick inserted into the crankcase of an automobile. This measurement is made directly and is messy and inconvenient.

There have been a number of devices suggested for making remote measurements of the level of oil in an automobile. One basic class of devices uses a float. As the float is buoyed up by the oil in the crankcase, means are provided to remotely provide an indication of the oil level. The oil level is used as a measurement of the amount of oil in the crankcase. Such devices have been proposed by Vincent in U.S. Pat. No. 4,034,608, Van Scoy et al. in U.S. Pat. No. 2,671,893, and Kress in U.S. Pat. No. 3,953,845.

The disadvantage of float devices is that they are responsive to the angle that the oil assumes in the crankcase. Oil level is, in turn, dependent upon the orientation of the vehicle. Thus, an indication of "low" oil may in fact be a reflection of the position of the vehicle. False indications are possible.

An alternative device has been suggested by Raby in U.S. Pat. No. 2,588,761. Raby provides an oil level indicator in which the dipstick is replaced by a hollow tube of which one end is in the crankcase and the other end communicates with a float chamber. In the float chamber is a float. The float chamber is, in turn, connected to a second hollow tube. This second hollow tube communicates with a valve. The other side of the valve communicates with a vacuum source. A push-button is mechanically linked to the valve. When the push-button is depressed, the vacuum source is connected to the second tube. The vacuum thereupon draws oil up the tube from the crankcase and into the float chamber. The float in the float chamber is mechanically linked to a diaphragm. If sufficient oil is drawn into the float chamber, the float will rise up moving the diaphragm. The diaphragm is connected to an electrical switch. The distortion of the diaphragm causes the closing of the switch and the subsequent lighting of a light indicating sufficient oil. If there is sufficient oil in the float chamber to cause the distortion of the diaphragm a second light remains on indicating that there is an insufficient amount of oil. The device proposed by Raby is extremely complex involving the use of suction, float, diaphragm, and interrelated electrical contacts. Raby also proposes the use of an intricate valve system and an external vacuum system. Furthermore, measurement is made by the transfer of oil from the crankcase to a second chamber, all of which makes for an exceedingly complicated device with various points of obvious weakness. The drawing of oil to fill a float chamber also is a disadvantage. Such a system mandates a strong suction. This is particularly true when one considers the wide changes of temperature to which an automobile is subject. The changes in temperature have a direct effect on the viscosity of the oil, thereby requiring an extremely strong vacuum for the system to work under all conditions.

Still another device has been proposed by Sherman, in U.S. Pat. No. 2,717,991. In Sherman, a hollow dipstick is connected to a piston slidably moveable within a solenoid coil. When electrical energy is applied to the solenoid coil, the generated magnetic field causes the piston to move upwardly. At the upper end of the solenoid are a pair of opposed contacts which are normally closed. The contacts are spaced over the axis of the solenoid coil. If air is drawn into the dipstick, the piston moves upwardly, and the contacts are separated. The opening of the contacts causes a break in the current flow to the solenoid. The magnetic field collapses and the piston drops. As soon as the piston drops, the contacts close again causing the solenoid to be activated and the piston to rise sharply again. A light bulb is in series with the solenoid circuit. As a result, the alternating on and off of the solenoid causes a blinking of the light bulb to thereby indicate remotely to the user that the oil in the crankcase of the vehicle is low.

If, instead of air, oil is drawn into the dipstick, the piston will rise slowly. The contacts will remain closed for longer periods of time. The more slowly blinking light bulb is intended to indicate that there is a sufficient quantity of oil.

There are many disadvantages to this device. Sherman measures the rate of flow of the oil into the hollow dipstick. Obviously, there is significant variation in oil viscosity in hot climates as opposed to colder areas. Under conditions of great engine heat or high ambient temperatures, the piston will move much more quickly than in colder climates. This may provide a false indication or lead to an accidental misreading of the blinking light. If the hole in the dipstick is somehow restricted by a partial clogging of the metering hole, a false indication may be given. Still another significant disadvantage is the potential for explosion. Thus, it should be observed that the piston of the Sherman device separates the contacts in the atmosphere of oil vapors. Such separation is likely to cause a spark. Oil fumes, which are obviously highly flammable, may be in the container formed about the Sherman device. Sherman places the bulb across the contacts and employs that as an arc suppressor. However, suppression of an arc may not eliminate a spark at the contacts. Such a spark may ignite the oil fumes. A further disadvantage to the Sherman device are the number of variables which determine the accuracy of the indicator. The operation of the device is dependent upon the inertia of the piston, friction between the piston and solenoid coil, changes in the magnetic field (as the field is alternately generated and collapsed), moisture, condensed oil vapors, and other foreign matter that may collect on the contacts and piston, and viscosity changes in the oil.

SUMMARY OF THE INVENTION

It is an object of this invention to provide a device which is adapted for mounting on the instrument panel of an automobile to enable the driver to check the oil quantity in a crankcase or the oil quantity in an automatic transmission or the water quantity in a battery or washer container without stopping the engine, lifting the hood, or leaving the driver's seat.

Still another object of this invention is to provide a device which is capable of indicating the quantity of liquid in a container of fixed dimensions which is substantially independent of the angle assumed by the container or the vehicle within which the container may reside.

It is a further object of this invention to provide a device which may measure remotely and by electrical means the quantity of oil or other liquid in a container without such measuring activity igniting any combustible material.

It is a further object of this invention to provide a device which is simple in use and construction, having a minimum number of parts, which may be manufactured and assembled at low cost.

Other objects and advantages of this invention will become more apparent in the course of the following description.

In accordance with the teachings of this invention, there is provided, as indicated, a device for indicating whether or not a predetermined minimum amount of liquid is in a vessel, such as the crank case of an automobile. This device includes a housing having therein at least a first chamber. There is provided a first flexible housing wall for changing the volume of the first chamber. A second flexible housing wall is also provided. A conduit is coupled to the first chamber and communicates with the vessel. Moving means are provided for moving the flexible wall from a quiescent position so as to expand the volume of the first chamber. Upon this expansion, the drop in fluid pressure is communicated to the conduit and the second flexible housing wall. If there is a minimum amount of liquid present in the vessel and the conduit receives therein the liquid, the second flexible wall moves from a quiescent position. If there is an absence of the minimum amount of the liquid, the second flexible wall remains substantially in its quiescent position. Indicating means are coupled to the second flexible wall to thereby give an indication of the presence or absence of the minimum amount of liquid.

A BRIEF DESCRIPTION OF THE DRAWING

FIG. 1 is a mechanical schematic of the device constructed in accordance with the teachings of this invention;

FIG. 2 is an electrical schematic of the device of FIG. 1; and

DESCRIPTION OF THE PREFERRED EMBODIMENT

Figure 3:
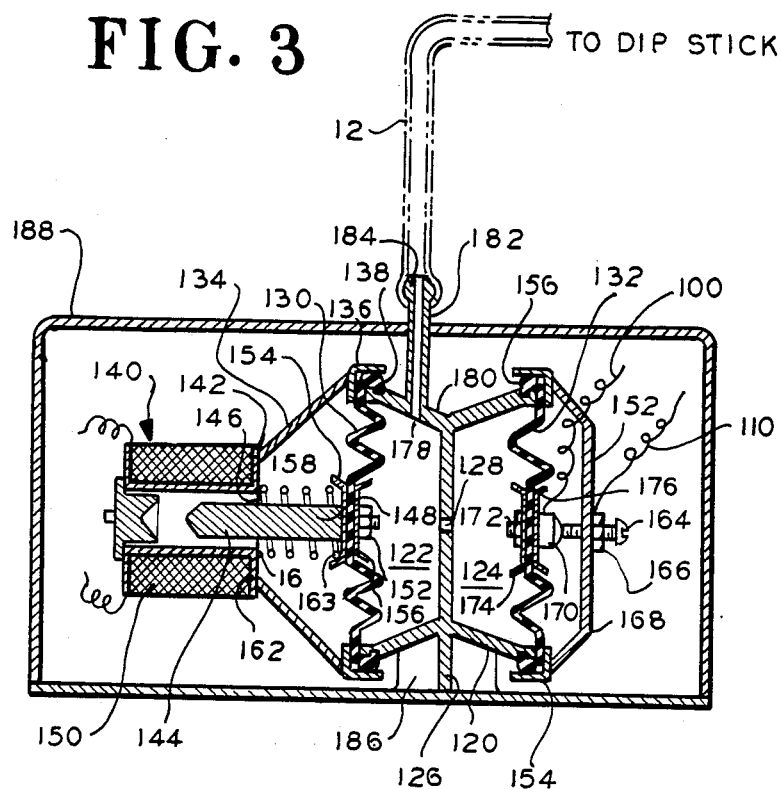
FIGS. 3 and 4 are mechanical schematics of other embodiments of the device constructed in accordance with the teachings of this invention.

Turning to the drawing, there is disclosed a mechanical schematic (FIG. 1) of the measuring device 10 of this invention. There is provided a dipstick 12 which may be a hollow tubular member closed at one end 14. The dipstick 12 may be made of any rigid material, such as metal or plastic, and is so dimensioned as to fit within the opening 16 intended to receive the ordinary dipstick or measuring stick of a crankcase. Thus, in the context of an automobile, the dipstick 12 would be insertable through the dipstick opening 16 and into the interior 18 of a crankcase 20 (part of the engine wall 22 is shown for example purposes only). The dipstick 12 may have a sampling hole 24 adjacent to the closed end 14. The purpose of the sampling hole 24 will be discussed more fully hereinafter.

A housing 26 may be provided for holding the measuring elements of this invention. Thus, the housing 26 may take the form of a rectangular container.

Secured to the interior of the housing 26 may be solenoid 28 of any well-known configuration. About the piston 30 of the solenoid 28 may be a resilient means such as a helical compression spring 32. One end 34 of the spring 32 abuts the end 36 of the solenoid 28 into which the piston 30 moves.

A suction bellows 38 is provided which may be made of any flexible material such a rubber, plastic, or the like. The suction bellows 38 may be secured at one end by means of an L-shaped bracket 40. One leg 42 of the bracket 40 supports the suction bellows 38. The other leg 44 of the bracket 40 may be joined to a wall 46 of the housing 26 by any convenient means such as by a rivet 48. The opposed end 50 of the suction bellows 38 may be held in position by the piston 30 to which it is joined. The juncture of the piston 30 and bellows 38 may be formed by means of a collar 52 into which the piston 30 is fitted. The collar 52 may be closed at one end (not visible) so as to insulate the electrically conductive piston 30 from the interior of the suction bellows 38.

A T-shaped or branched hollow tube 54 may have one end 56 in communication with the suction bellows 38 through its bracket supported end 58. One end 62 of the stem 60 of the tube 54 may communicate with a sensing bellows 64 at one end. The opposed other end 66 of the sensing bellows 64 may be closed and have secured thereto an electrically conductive cap 68. The sensing bellows 64 may be made of the same material as that of the suction bellows 38. The other end 70 of the tube 54 may exit the housing 26 through a conveniently provided aperture. This end 70 of the tubing 54 may be connected by means of a flexible tubing 72 to the dipstick 12. The tube 54 may be made of any rigid nonconductive material, such as glass or plastic, so as to support the sensing bellows 64.

A second L-shaped bracket 74 may have one leg 76 secured to a wall 78 of the housing 26 by any joining means such as a rivet 80 or the like. The other leg 82 of the second bracket 74 may have a screw hole therethrough to which may be secured an electrically conductive screw 84. The screw 84 may be in contact with the electrically conductive cap 68. The bracket 74 is preferrably electrically conductive.

At some remote location, for example the dashboard of a vehicle, may be located a push-button switch 85 and a bulb 86, both of which may be secured to the panel, as is well known in the art. The bulb 86 may be disposed in front of an opening in the dashboard to which a lens 88 has been secured.

The push-button switch 85 may be of the type which upon pressing results in the closing of two electrical contacts. One side 90 of the switch 85 may be connected by means of a wire 92 to a car battery (indicated only by a symbol 94). The other side 96 of the switch 85 may be connected by a wire 98 to one side of the bulb 86. Another wire 100 may lead from the side 96 of the switch 85 to one side 102 of the solenoid coil 104 (see FIG. 2).

The other side 106 of the solenoid coil 104 may be connected by means of a wire 108 to the rivet 80 connected to the leg 76 of the second bracket 74. The cap 68 may be connected by means of a wire 110 to the other side of the bulb 86.

In the preferred embodiment, the dipstick 12 may be made of brass and be approximately 14 inches long to reach inside the crankcase. It may have, for example, an outer diameter of ⅛ of an inch and an interior diameter of 1/16 of an inch. The metering hole 24 may have an approximate diameter of 3/64 of an inch and be so disposed as to be within the range of a proper oil level for an automobile.

The flexible hosing 72 may be of any suitable material such as plastic or rubber so as to provide a snug fit at the open end 116 of the hollow dipstick 12 and the connection with the rigid tube 54. It is preferred that the suction bellows 38, in the example provided herein, have an outer diameter of ⅞ of an inch at the furthest extension of its pleating 118 and a smaller pleat 120 diameter of ⅝ of an inch. Fully collapsed, the bellows are preferably ⅜ inch long and fully expanded ⅞ inch long. It is preferred that the sensing bellows 64 be smaller in diameter and axial length than the suction bellows 38. The solenoid 28 may be, for example, a 12 volt 1.7 amp solenoid having a plunger stroke of approximately ½ inch. The rigid T-tube 54 should, for example, provide a snug fit at the openings 56 and 62 in the suction and sensing bellows 38 and 64 respectively and should preferably have an internal diameter of 3/32 inch.

In assembly, the entire box 26 may be secured to a bracket 112 and mounted to the fire wall or the like (not shown) of a vehicle. It is preferred that the bracket 112 and box 26 be provided with the common ground of the vehicle to thereby complete the electrical circuit (FIG. 2). Obviously, the points of connection and grounds are a matter of choice.

In operation, pressing the button 85 closes the contacts 90 and 96 thereby causing current to flow from the battery 94 through wires 92 and wire 100 through the solenoid 104 and line 108 to ground. This causes the piston 30 of the solenoid 28 to be pulled in. The effect of pulling in compresses the spring 32 and enlarges the suction bellows 38 thereby creating a partial vacuum or reduced gas pressure in the tube 54, flexible tubing 72 and dipstick 12. If the metering hole 24 is below the level of oil 114, oil will enter the metering hole 24 and be drawn up into the tube. In the preferred embodiment, the oil may be expected to rise approximately 5 inches above the level of the sampling hole 24 and held at this level. (The exact height is not significant.) As this occurs, the suction bellows 38 will draw the gas, preferably air, through the tube 54 from the sensing bellows 64. Since the sensing bellows 64 is freely secured at its end 62 to the stem 60 of the T-tube 54, the bellows 64 will be caused to collapse toward the tube 60, thereby drawing the cap 68 out of contact with the screw 84. The circuit (FIG. 2) will open, thereby causing the light bulb 86 to go out. If the dipstick 12 draws air instead, due to an insufficient amount of oil 114 in the crankcase 20, the sensing bellows 64 will not be caused to collapse and the light 84 will remain on.

After the operation, which takes a few seconds to perform, the button 84 may be released, opening the electrical circuit. The spring 32 forces the piston 30 out of the solenoid 28 and returns the suction bellows 38 to its original position ready for the next testing procedure.

It will be immediately apparent that the light bulb 86 is off when the oil is at a proper level and on when there is an insufficient amount of oil. In the alternative, the bulb 86 may be connected so as to light when there is a sufficient amount of oil and to otherwise be off. This may be accomplished, for example, by connecting the bulb 86 across the cap 68 contacts and sensing screw 84, so that when the contact between the screw 84 and cap 68 opens, due to a sufficient amount of oil, the bulb 86 will light. At all other times, the contact between the screw 84 and cap 68 electrically short out the bulb 86. Still another alternate consideration is the use of a delay circuit which may be placed in parallel with the bulb 86. Such delay circuit, which is well known in the art, delays the lighting of the bulb 86 for a period of time so that the sensing function may be fully completed before lighting or turning off the bulb 86.

The screw 84 and cap 68 provide a convenient sensitivity adjustment for such variables as bellows wear, aging of parts, or the like. The entire hydraulic assemblage is shielded from the electrical circuit so that oil vapors cannot be ignited by a spark from the contacts 68 and 84. While this device is preferably intended for use in connection with the crankcase of a motor vehicle, it has obvious other applications to remote measurements of other liquids.

It is preferred that the sampling hole be placed at a point corresponding to the marking of the minimum oil level. While the operation of this sampling device 10 is clearly subject to the level of the oil at the sampling hole 24, the overall effect of changes in oil level are substantially reduced, as compared to float devices.

In a preferred embodiment of this invention, there is disclosed a housing 120 which may be made of any structural material, preferably plastic. The housing is in the shape of two symmetrically-shaped, cylindrical cup-like portions 122 and 124, conjoined by a common wall 126. An aperture 128 in the wall 126 provides access from one portion 122 to the other portion 124.

Diaphragms 130 and 132 close the cup portions 122 and 124, respectively, to form two opposed chambers 122 and 124. The diaphragms 130 and 132 may be constructed in a manner well known in the art. The diaphragms are preferably circular and enclose the chamber portions 122 and 124, as indicated. The symmetrical center of each diaphragm 130 and 132 is planar and may have an aperture therethrough.

A frusto-conically shaped cap 134, which may also be made of plastic, has a circularly shaped larger base formed with an extending L-shaped skirt 136. This skirt 136 is so dimensioned as to grip the marginal edge 138 of one of the diaphragms 130 and hold that diaphragm 130 to the housing 120.

The cap 134 may be integrally formed with a solenoid 140 which is mounted upon the frusto end 142 of the cap 134. The armature 144 is so disposed as to pass through a central aperture 146 in the frusto end 142 of the cap 134. The and 148 of the armature 144 outside of the solenoid coil 150 may be secured to the center of the diaphragm 130 by any convenient means, such as, for example, a nut 152. Washers 154 and 156 on either side of the diaphragm 130 retain the diaphragm 130 in a planar configuration the parallel to the radial end of the armature 144.

About the armature 144 may be a spring 158. One end 160 of the spring 158 engages the interior side 162 of the frusto end 142 of the cap 134. The other end 162 of the spring 158 engages one of the washers 154 secured to the diaphragm 130.

In a like manner, a second cap 152 may be furnished with an L-shaped marginal skirt 154. This skirt 154 is so dimensioned as to grip the marginal edge 156 of the other diaphragm 132 to the housing 120.

Centrally disposed and threaded through the center of the circularly shaped cap 152 may be an electrically conductive screw 164. The screw 164 may be made relatively adjustable by means of a nut 166 threaded upon the screw 164 and abutting the exterior side 168 of the cap 152. An electrical contact 170 may be secured to the center of the diaphragm 132 by any convenient means, such as a screw and nut 172. The center of the diaphragm may be restrained in parallel planes by opposed washers 174 and 176.

There are thus defined two chambers 122 and 124 with a passage 128 therebetween. One of the chambers 122 may have an aperture 178 extending through a side wall 180 of the housing 120. The housing wall 120 may conveniently have an extending conduit 182 formed therein through which the aperture 178 passes. One end 184 of the conduit 182 may be enlarged in the form of a bead to retain thereon a tube 72 leading to the dipstick 12.

The device is electrically connected, in the same manner as previously discussed, with the solenoid coil 150 in series with the spaced contacts 164 and 170 to the push buttons (not shown in FIG. 3).

In operation, the solenoid coil 150 is energized, pulling back upon the armature 144. If the dipstick 12 has oil therein, the suction created in the chamber 122 will result in a loss of pressure in the second or sensing chamber 122, the gas will pass through the opening 128, and the contacts 164 and 170 will separate as before. If there is no oil in the dipstick, the air flowing through the hole 24 will permit the pressure in the chambers 122 and 124 to remain substantially unchanged and the contacts 170 and 154 will remain closed.

The housing 120 may be furnished with a stem or flange 186 for securing the entire assembly to a protective covering housing 188.

The spring 158 is employed in order to aid the armature 144 to its quiescent position due to the long armature stroke.

Figure 4:
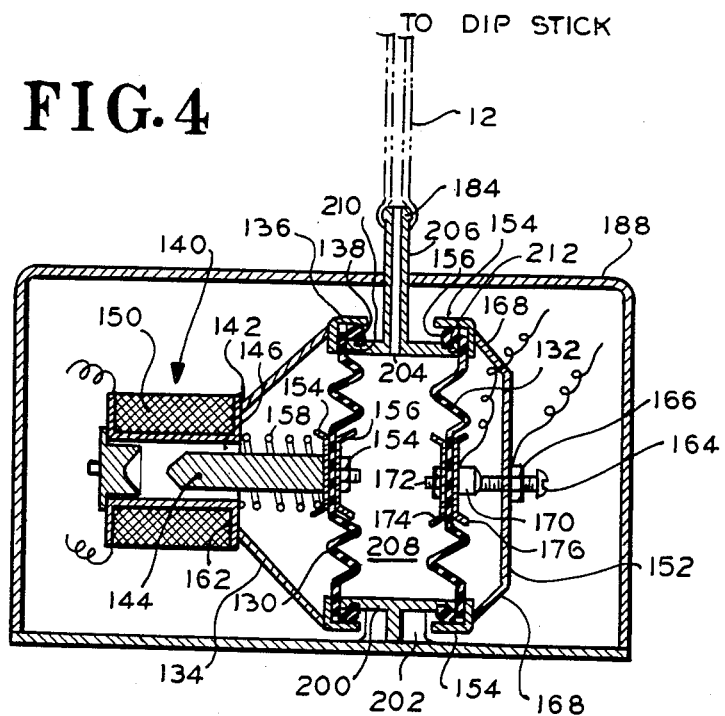

In another embodiment (FIG. 4), the same reference numbers are used to identify similar elements. Thus, there is provided an internal housing 200 which may be substantially cylindrical in shape. The internal housing 200 may be furnished with an external, radially extending flange 202 so that it may be conveniently secured to the protective enclosed outer housing 188. The housing 200 may have an aperture 204 extending outwardly and axially through an integrally formed outwardly radially extending tube 206 so as to communicate the interior 208 of the housing 200 with the tube 12 leading to the dipstick (not shown). The housing 200 may be open at opposed radial ends 210 and 212, respectively. Each radial end 210 and 212 is closed with a circularly shaped diaphragm 130 and 132, respectively. The housing may be made of any structurally rigid material, preferably a plastic. The diaphragms 130 and 132 are preferably of a resilient material, such as rubber or the like. As previously discussed, the the diaphragms 130 and 132 are held in place by caps 134 and 152, respectively. A solenoid 140 is secured to the frusto end 142 of the cap 134 so that the armature 144 may pass through the cap aperture 146 and be engaged, by means of a screw and nut 154, to the diaphragm 130. A spring 158 is about the armature 144 and between the cap end 142 and the diaphragm 130 to return the armature 144 to its initial or quiescent position.

The second cap 152 engages and holds in place the second diaphragm 132 against the other radial end 212 of the housing 200. A contact, which may be in the form of a screw 164 extends through the cap and is in registry with a second contact 170 secured to the second diaphragm 132 by means of a screw and nut 172 or other joining means.

The device of this invention may be distinguished from the previous embodiment in that the diaphragms 130 and 132 enclose a single chamber 208. The operation, however, is essentially similar. As air pressure in the chamber 208 drops, due to the presence of oil covering the hole 24 in the dipstick, the sensing diaphragm 132 moves, separating the contacts 164 and 170. If the hole 24 in the dipstick is open, admitting air, the diaphragm 132 will not move. The single chamber construction provides a more economical construction than has heretofore been disclosed. In all other respects, this device operates in the same manner as the others disclosed herein.

What is claimed:

1. A device for indicating whether or not a predetermined minimum amount of liquid is in a vessel, such as the crank case of an automobile, comprising:
  (a) a housing having therein at least a first chamber;
  (b) a first flexible housing wall for changing the volume of said first chamber;
  (c) a second flexible housing wall;
  (d) a conduit coupled to said first chamber and in communication with said vessel;
  (e) moving means for moving said first flexible wall from a quiescent position so as to expand said volume of said first chamber; upon said expansion the drop in fluid pressure is communicated to said conduit and said second flexible housing wall; if there is the minimum amount of liquid present in the vessel, and said conduit receives therein the liquid, said second flexible wall moves from a quiescent position; if there is an absence of the minimum amount of the liquid, said second flexible wall remains substantially in its quiescent position; and
  (f) indicating means, coupled to said second flexible wall, for providing an indication of said positions of said second flexible wall to thereby give an indication of the presence or absence of the minimum amount of liquid.

2. The device of claim 1 further comprising a second chamber, said first flexible wall being one of the walls of said first chamber, said second flexible wall being one of the walls of said second chamber.

3. A device as recited in claim 2 wherein said moving means comprises means for returning said first chamber flexible wall to its quiescent position upon conclusion of the operation of the device.

4. A device as recited in claim 3 wherein said first and second chambers each comprises bellows-shaped housing.

5. A device as recited in claim 4 wherein said first chamber bellows has one closed end secured to moving means and an opposed open end secured to said conduit, said bellows being intermediate to said opposed ends, said bellows comprising said first chamber flexible wall.

6. A device as recited in claim 5 wherein said second chamber bellows has one closed end in cooperative engagement with said indicating means and an opposed open end secured to said conduit, said bellows being intermediate to said opposed ends; said closed end comprises said second chamber flexible wall.

7. A device as recited in claim 6 wherein said moving means and said indicating means being simultaneously enabled.

8. A device as recited in claim 7 wherein said moving means comprises a solenoid coupled to said first chamber closed end and said indicating means comprises an electrical circuit including at least a pair of electrical contacts in cooperative engagement and movable with respect to one another so that a change of condition is established by the opening or closing of said contacts; one of said contacts is secured to said second chamber flexible wall so that, upon said moving of said second chamber wall, said change of condition occurs.

9. A device as recited in claim 1 wherein said first and second flexible walls comprise first and second diaphragms, respectively.

10. A device as recited in claim 9, said housing comprising a second chamber and a common wall separating said first and second chambers, each chamber being closed by one of said diaphragms.

11. A device as recited in claim 10 wherein said common wall has an aperture therethrough so that fluid in said first chamber communicates with fluid in said second chamber.

12. A device as recited in claim 9 wherein said first chamber is closed at opposed ends by said flexible housing walls.

13. A device as recited in claims 10 or 12 wherein said housing comprises a symmetrical structure; said diaphragms being disposed opposed to one another; said housing further comprises a first and second cap for engaging and holding said first and second diaphragms, respectively, to said housing; said moving means being secured to said first cap.

14. A device as recited in claim 13 wherein said diaphragms being symmetrical, said moving means comprises a solenoid, the armature of said solenoid engaging and being secured to said diaphragm at the symmetrical center thereof; said indicating means comprises a pair of electrical contacts, the first of said contacts being secured to said second diaphragm at the symmetrical center, the second of said contacts being secured to said second cap and in registry with said first contact.

15. A device as recited in claim 14 wherein said cap contact comprises a screw rotatably secured for movement toward and away from said diaphragm contact.

* * * * *